United States Patent [19]

Comroe et al.

[11] Patent Number: 5,239,674
[45] Date of Patent: Aug. 24, 1993

[54] METHOD FOR TRANSFERRING PRIVATE DATA TRANSMISSIONS FROM A TRUNKING COMMUNICATION SYSTEM TO A CELLULAR COMMUNICATION

[75] Inventors: Richard A. Comroe, Dundee; Gary W. Grube, Palatine, both of Ill.

[73] Assignee: Motorola, Inc., Schaumburg, Ill.

[21] Appl. No.: 608,879

[22] Filed: Nov. 5, 1990

[51] Int. Cl.⁵ .................... H04B 7/26; H04Q 7/00
[52] U.S. Cl. .................... 455/33.1; 455/34.1; 455/54.1; 455/56.1; 379/59
[58] Field of Search .............. 455/33, 34, 53, 54, 455/56, 76, 89, 33.1–33.4, 34.1, 34.2, 53.1, 54.1, 54.2, 56.1; 379/59, 60, 63

[56] References Cited

U.S. PATENT DOCUMENTS

| | | | |
|---|---|---|---|
| 4,802,235 | 1/1989 | Treatch | 455/76 |
| 4,972,455 | 11/1990 | Phillips et al. | 379/59 |
| 5,003,629 | 3/1991 | Ness-Cohn et al. | 455/54 |
| 5,058,199 | 10/1991 | Grube | 455/15 |

Primary Examiner—Reinhard J. Eisenzopf
Assistant Examiner—Chi Pham
Attorney, Agent, or Firm—Timothy W. Markison; Steven G. Parmelee

[57] ABSTRACT

In a geographic region that contains a trunking communication system and a cellular communication system, wherein the coverage area of each system substantially overlaps, a method that transfers a private data transmission from the trunking communication system to the cellular communication is disclosed. When a data transmission unit is prompted to transmit data, it transfers its affiliation from the trunking communication system to the cellular communication system. Once affiliated with the cellular communication system, the data transmission unit transfers its data via the cellular communication system. The trunking communication system detects the requested data and routes the requested data to the appropriate data target. Once the data transmission unit has transmitted the requested data, it transfers its affiliation back to trunking communication system.

7 Claims, 2 Drawing Sheets

METHOD FOR TRANSFERRING PRIVATE DATA TRANSMISSIONS FROM A TRUNKING COMMUNICATION SYSTEM TO A CELLULAR COMMUNICATION

TECHNICAL FIELD

This invention relates generally to communication systems and in particular to a method that allows a trunking communication system to utilize a cellular communication system to privately transmit data.

BACKGROUND OF THE INVENTION

The basic operation and structure of trunking communication systems and cellular telephone communication systems (cellular communication systems) are known. Trunking communication systems typically comprise a communication channel controller, a limited number of repeaters that transceive information via communication channels, and a plurality of communication units which may be mobile vehicle radios and/or portable radios and may also include data transmission features. Of the communication channels, one is typically chosen to be a control channel. The control channel typically transceives operational information between the communication channel controller and the data transmission features of the plurality of communication units such that, for example, the plurality of communication units can access the communication channels. Typically, the trunking system has a relatively large geographic coverage area, depending on the environment that the trunking communication system is located, for example, the coverage area may be approximately thirty-five miles in diameter.

A cellular communication system typically comprises a mobile telephone switching office (MTSO), a plurality of cells, a limited number of communication channels, and a plurality of communication units which may be cellular telephones. Each of the plurality of cells comprises some of the limited number of communication channels, wherein one of the communication channels is designated as the control channel for that cell. The control channel transceives operational information between the plurality of communication units within the cell and the MTSO such that the communication units can place telephone calls via a phone system. Typically, the coverage area of each cell is relatively small in comparison with that of a typical trunking communication system. For example, a typical cell coverage area is approximately two miles in diameter. Because an individual cell coverage area is relatively small, the communication channels may be reused, at least once, with in a geographic region of approximately the same size as a trunking communication system.

In trunking communication systems, data may be transmitted, on the control channel, from the communication channel controller to the plurality of communication units. Such data transmissions cause data traffic on the control channel and in many instances reduce the overall efficiency of the trunking communication system. For example, during a dynamic regrouping of communication units, each communication unit must be addressed individually due to unique features of the communication unit. (Unique features of a communication unit may include priority calling, secure calling, private calling, etc.) Dynamic regrouping for large groups-of fifty communication units or more-typically requires a substantial amount of time-at least several seconds-to regroup the communication units.

In addition to receiving data from the communication channel controller, each of the plurality of communication units may individually transmit data to the communication channel controller. Data transmissions from a communication unit to the communication channel controller is also transmitted on the control channel of the trunking communication system which further adds to the data traffic. Such point to point data transmissions in the trunking communication system are relatively inefficient due to the limited number of communication channels used as control channels. (Typically, only one communication channel is designated as a control channel, thus all data transceived within the trunking communication system must be transceived over that control channel.) Cellular communication systems, however, are relatively efficient at processing point to point data transmissions due to the relatively large number of control channels; at least one for each cell of the cellular communication system where data transmissions in the cellular communication system include, for example, placing telephone calls.

Therefore, a need exists for a method that allows a trunking communication system to take advantage of the communication channel efficiency of a cellular communication system for point to point, or private, data transmissions.

SUMMARY OF THE INVENTION

This need and others are substantially met by the private data transmission in a multi-mode communication system disclosed herein. In a geographic region that contains a trunking communication system and a cellular communication system, wherein the trunking communication and the cellular communication system have substantially overlapping coverage areas, wherein the trunking communication system is operably coupled to the cellular communication system, and wherein some data transmission units are affiliated with the trunking communication system and are operably in either the trunking communication system or the cellular communication system, a method for a data transmission unit to communicate data with a data target is presented. The method comprises the steps of receiving a data transmission request, which may be internally generated within the data transmission unit or received from a communication channel controller. After receiving the data transmission request, the data transmission unit transfers its affiliation from the trunking communication system to the cellular communication system. Once affiliated with the cellular communication system, the data transmission unit transmits the requested data information to a designated data target via the cellular communication system.

DESCRIPTION OF A PREFERRED EMBODIMENT

Figure 1:
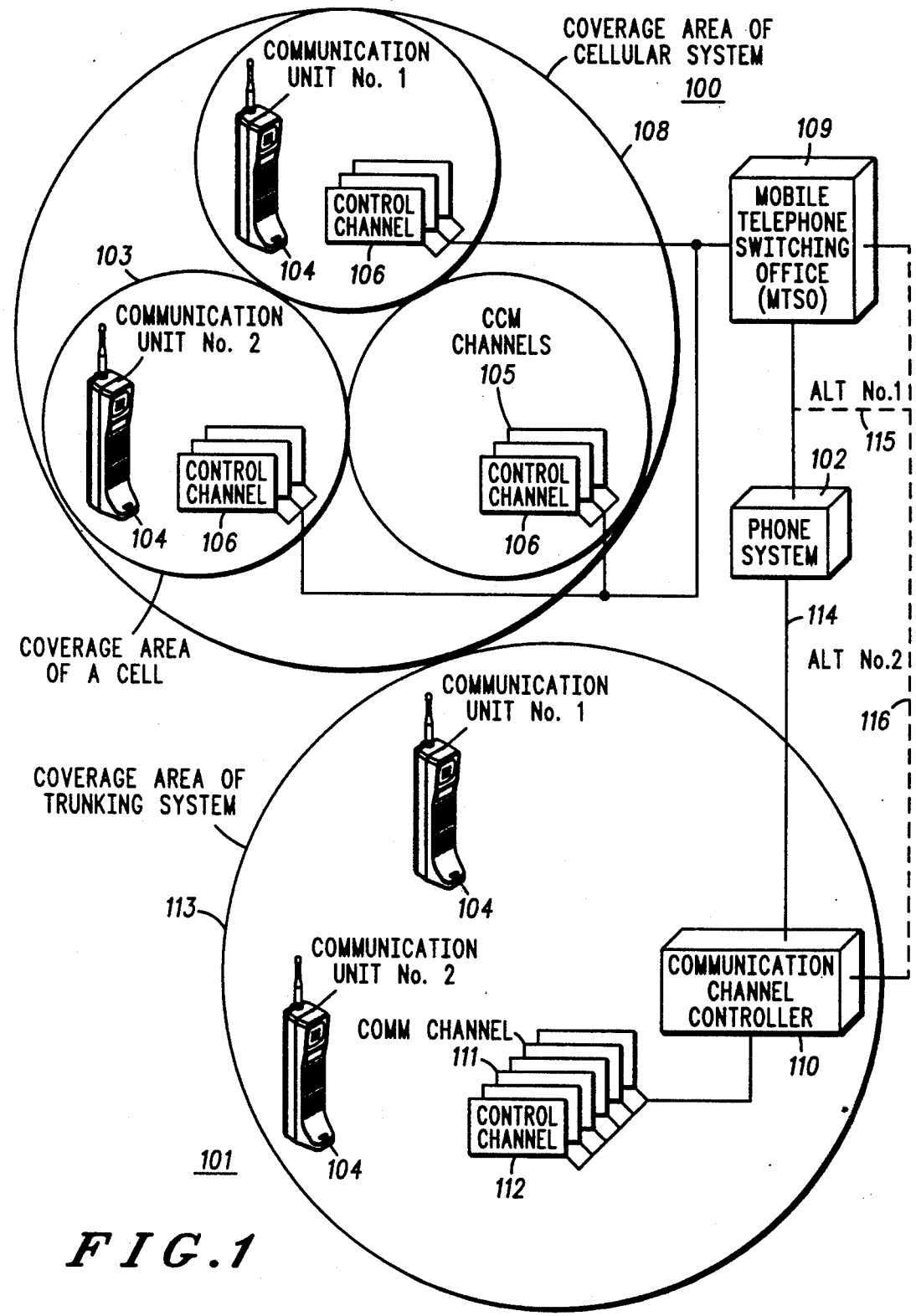
FIG. 1 illustrates a cellular communication system and a trunking communication system each having substantially the same coverage areas in accordance with the present invention.

FIG. 1 illustrates a trunking communication system (101) and a cellular communication system (100) operably coupled together in accordance with the present invention. The cellular communication system comprises a mobile telephone switching office (MTSO) (109) and a plurality of cells (103) (3 shown), where each cell is operably coupled to the MTSO (109) and has a specific coverage area (107). Each cell comprises a limited number of communication channels (105) which may be carrier frequencies, frequency pairs, and/or time division multiplexing (TDM) slots, wherein one of the communication channels is designated as a control channel. The summation of the coverage area of each cell (107) comprises the coverage area of the cellular communication system (108). The cellular communication system also comprises a plurality of communication units (104) (2 shown) where the communication units are equipped with one receiver and one transmitter that has adequate bandwidth to operate in both the trunking communication system and the cellular communication system.

The trunking communication system (101) comprises a communication channel controller (110), a plurality of communication channels (111), wherein one of the communication channels is designated as a control channel (112), and a plurality of communication units (104). The coverage area of the trunking communication system (113) substantially overlaps and may be approximately equal to, the coverage area of the cellular communication system (108). However, for illustrative purposes the coverage areas are shown separately.

The trunking communication system (101) is operably coupled to the cellular communication system by one of three methods. The first and most convenient method, especially when the communication systems are manufactured by different manufacturers, is to couple the systems together through a phone line (114) or a plurality of phone lines to a phone system (102). This coupling method allows the trunking communication system to transfer messages to the cellular communication system by placing telephone calls to the cellular communication system via the telephone system (102). An alternative method is to directly connect the communication channel controller (110) to the MTSO (109) by a direct connection (116). Finally, if the communication systems are manufactured by the same manufacturer, or an agreement exists between the manufacturers, the communication channel controller (110) may be directly coupled into the communication channel links (117) of the cellular communication system by a coupling link (115) that is similar to a telephone link.

Generally, in accordance with the present invention, data transmission units are affiliated with the trunking communication system by monitoring the trunking communication system's control channel. When a particular data transmission unit is prompted to transmit data, it transfers its affiliation from the trunking communication system to the cellular communication system. Once the particular data transmission unit is affiliated with the cellular communication system, the requested data is transmitted via the cellular communication system. The trunking communication system, through a phone connection to the cellular communication system, receives the requested data information and deciphers it to determine the data target. The requested data information is then routed, by the communication channel controller, to the data target. Once the particular data transmission unit has transmitted the requested data information, it transfers its affiliation back to the trunking communication system. Note that a data transmission unit may be a communication unit that acts as a trunking communication radio that transceives both voice and data while affiliated with the trunking communication system and acts as a cellular telephone that transceives both voice and data while affiliated with the cellular communication system.

Figure 2:
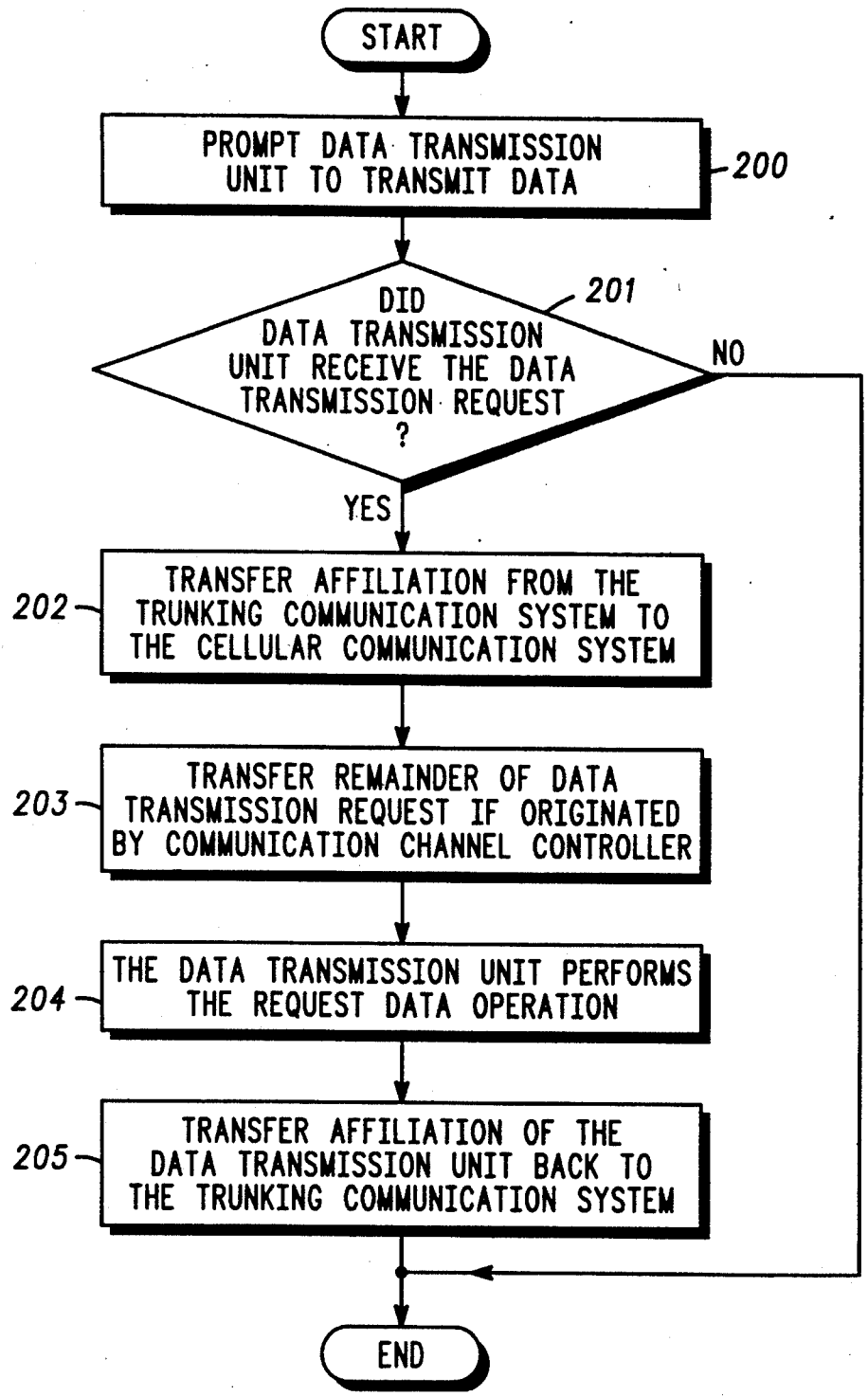
FIG. 2 illustrates a logic diagram that may be used to implement the present invention.

FIG. 2 illustrates a logic diagram of the present invention. At step (200), a data transmission unit is prompted with a data transmission request. The prompting of the data transmission unit may be done by a user of the data transmission unit wherein the user desires to transmit data either to another data transmission unit or to the communication channel controller. The prompting may also be initiated by the communication channel controller, wherein the communication channel controller requests the data transmission unit to transmit data information or desires to send data to the data transmission unit. If the data transmission unit did not receive the data transmission request (201), either due to the data transmission being off or out of range, the process ends.

If the data transmission unit received the data transmission request (201), the data transmission unit transfers its affiliation from the trunking communication system to the cellular communication system (202). Transferring affiliation from the trunking communication system to the cellular communication system may be accomplished by changing a local oscillator of a receiver and a transmitter of the data transmission unit such that the data transmission unit is operable in the cellular transmit and receive areas as opposed to the trunking transmit and receive bands. Transferring affiliation back to the trunking communication system is accomplished in a similar manner except that the local oscillator is adjusted such that the data transmission unit is operable in the trunking transmit and receive bands.

Once the data transmission unit is affiliated with the cellular communication system, the communication channel controller, via the interconnection to the cellular communication system, transmits the remainder of the data transmission request (203). The remainder of the data transmission request may be a telephone number that, in addition to identifying the particular data transmission unit, contains data or a request for specific data transmissions. For example, three digits of the telephone number may indicate a talk group assignment for the data transmission unit, such that the data transmission unit automatically changes its talk group affiliation when the telephone number is detected. Another example may be that the telephone number requests the data transmission unit to transmit data relating to its on air time.

After receiving the remainder of the data transmission request, the data transmission unit performs the requested operation (204). If the requested operation is to transmit data to a data target, the data transmission unit places a telephone call, via the cellular communication system, to the trunking communication system, wherein the requested data is contained within the digits of the telephone number. The trunking communication system deciphers the transmitted data and routes at least a representation of the data to the data target. A data target may be another data transmission unit, the communication channel controller, a console of the trunking communication system, or a particular data acquisition device such as a data recorder that may be used to record on air time to determine charges, etc. Once the requested data has been transmitted by the data transmission unit, it transfers its affiliation back to the trunking communication system (205) and the process ends.

If the data transmission unit prompted the data transmission request (200), it transfers its affiliation to the cellular communication system. Once affiliated with the cellular communication system, the data transmission unit places a telephone call to the trunking communication system via the cellular communication system (204). The communication channel controller receives and deciphers the telephone call to extract the data and the data target, if one is included. If the data was intended for a data target, the communication channel controller routes the data to the data target. Once the data transmission unit has transmitted the data, it transfers its affiliation back to the cellular communication system (205).

What is claimed is:

1. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, and wherein at least some of a plurality of data transmission units are affiliated with at least one trunking communication system and are operable in either the at least one trunking communication system or the at least one cellular communication system, a method for a data transmission unit of the at least some of the plurality of data transmission units to communicate data with a data target that is affiliated with the at least one trunking communication system, the method comprises the steps of:
   a) transferring affiliation of the data transmission unit from the at least one trunking communication system to the at least one cellular communication system;
   b) transmitting a data packet to the data target by the data transmission unit via the at least one cellular communication system.

2. The method of claim 1 further comprises the step of transferring affiliation of the data transmission unit from the at least one cellular communication system to the at least one trunking communication unit when the data packet has been transmitted.

3. In the method of claim 1, step (a) further comprises the substep of:
   a1) prompting, by a communication channel controller of the at least one trunking communication system, the data transmission unit to transfer its affiliation to the at least one cellular communication system; and
   a2) transferring, by the data transmission unit, its affiliation from the at least one trunking communication system to the at least one cellular communication system.

4. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, and wherein at least some of a plurality of data transmission units are affiliated with the at least one trunking communication system and are operable in either the at least one trunking communication system or the at least one cellular communication system, a method for communicating data between a data transmission unit of the at least some of the plurality of data transmission units and a data target that is affiliated with the at least one trunking communication system, the method comprises the steps of:
   a) generating a data transmission request for the data transmission unit;
   b) transferring affiliation of the data transmission unit from the at least one trunking communication system to the at least one cellular communication system when the data transmission request is processed;
   c) transmitting a data packet via at least one control channel of the at least one cellular communication system to the trunking communication system; and
   d) receiving the data packet by the data target via the at least one trunking communication system.

5. In the method of claim 4, step (a) further comprises generating, by the data transmission unit, the data transmission request.

6. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, and wherein at least some of a plurality of data transmission units are affiliated with the at least one trunking communication system and are operable in either the at least one trunking communication system or the at least one cellular communication system, a method for a communication channel controller of the at least one trunking communication system to control transmission of a data packet between a data transmission unit of the at least some of the plurality of data transmission unit and a data target, the method comprises the steps of:
   a) transmitting a data transmission request to the data transmission unit, wherein the data transmission request instructs the data transmission unit to transfer affiliation from the at least one trunking communication system to the at least one cellular communication system and to transmit a data packet when the data transmission unit is affiliated with the at least one cellular communication system;
   b) deciphering the data packet to identify the data target; and
   c) instructing the data target to transfer its affiliation from the trunking communication system to the cellular communication system, such that it receives the data packet via the at least one cellular communication system.

7. In a geographic region that contains at least one trunking communication system and at least one cellular communication system, wherein the at least one trunking communication system and the at least one cellular communication system have substantially overlapping coverage areas, wherein the at least one trunking communication system is operably coupled to the at least one cellular communication system, and wherein at least some of a plurality of data transmission units are affiliated with the at least one trunking communication system and are operable in either the at least one trunking communication system or the at least one cellular communication system, a method for a data transmission unit of the at least some of the plurality of data transmission units to receive data from the at least one trunking communication system, the method comprises the steps of:

a) receiving a request from the at least one trunking communication system to transfer affiliation from the at least one trunking communication system to the at least one cellular communication system;
b) transferring affiliation to the at least one cellular communication system; and
c) while affiliated with the cellular communication system, receiving a data packet from the at least one trunking communication system via the at least one cellular communication system.

* * * * *